April 21, 1970

W. E. MOTT ET AL 3,508,047

METHOD AND APPARATUS FOR THE ACCURATE ANALYSIS OF HYDROCARBON
MATERIAL USING A MULTIPLE OF RADIATION SOURCES

Filed May 25, 1966

INVENTORS.
WILLIAM E. MOTT &
DONALD F. RHODES

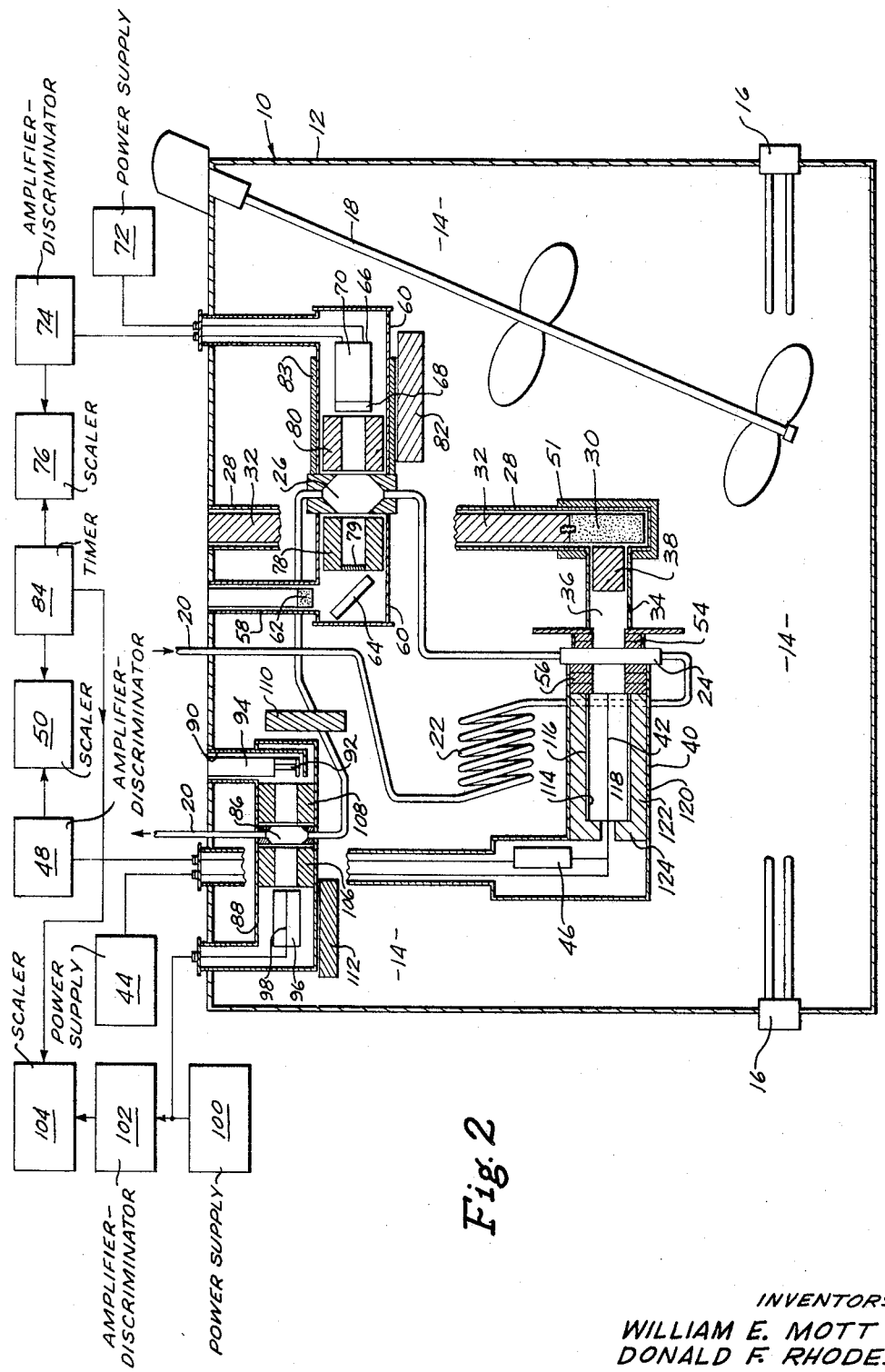

United States Patent Office 3,508,047
Patented Apr. 21, 1970

3,508,047
METHOD AND APPARATUS FOR THE ACCURATE ANALYSIS OF HYDROCARBON MATERIAL USING A MULTIPLE OF RADIATION SOURCES
William E. Mott, O'Hara Township, Allegheny County, and Donald F. Rhodes, Plum Borough, Pa., assignors to Gulf Research & Development Company, Pittsburgh, Pa., a corporation of Delaware
Filed May 25, 1966, Ser. No. 552,741
Int. Cl. G01n *23/12;* G01t *3/00;* H01j *39/32*
U.S. Cl. 250—43.5                    10 Claims

ABSTRACT OF THE DISCLOSURE

A method and apparatus for accurately determining the chemical composition and density of hydrocarbons by intercorrelating the transmitted radiation from a thermal neutron source and a high energy photon source with substantial elimination of the noise component of the transmitted radiation. Additional types of radiation are used for the analysis of other elements in the sample.

---

Figure 1:
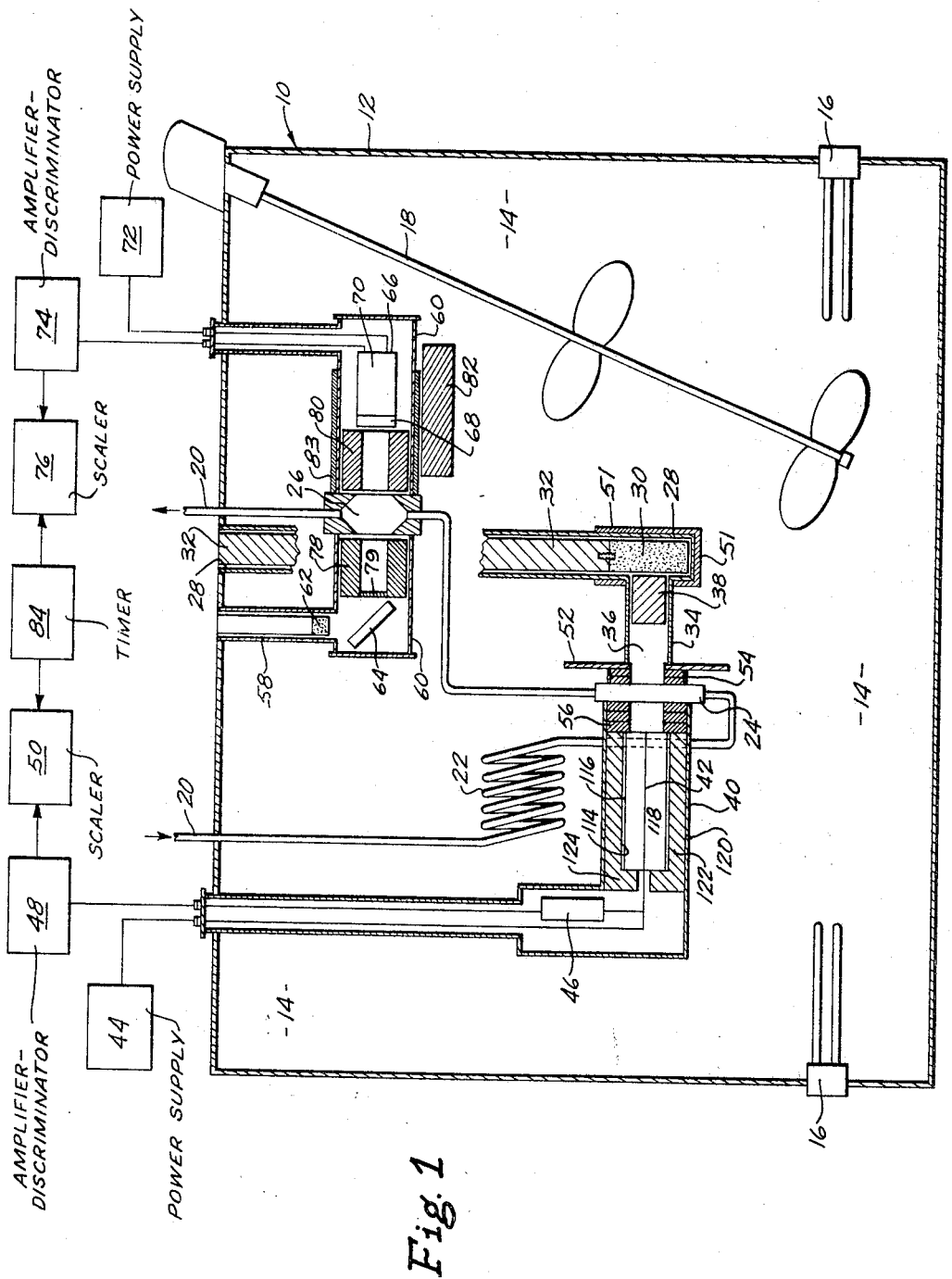

This invention relates to a method and apparatus for analyzing hydrocarbon materials and for controlling a process thereby. More particularly it concerns a method and apparatus in which the analysis is accomplished by measuring and correlating the intensity of at least two types of radiation transmitted both through a sample of a hydrocarbon material and through reference standards.

In the art pertaining to laboratory and industrial applications of the technology of nucleonics, there have been suggested many methods and apparatus for analyzing the chemical and physical properties of a material by measuring the effects of nuclear or atomic interactions with beams of radiation impinging on the material to be analyzed. For example, it has been suggested that the relative proportions of the constituents present in a hydrocarbon could be determined by measuring the intensity of beams of neutrons that are scattered by, or transmitted through, a sample of the hydrocarbon. Similarly it has been suggested that the concentration of an element other than hydrogen or carbon might be determined by measuring the intensity of a beam of substantially monochromatic low energy photons that is transmitted through a sample of the material to be analyzed. It has been suggested further that the density of a material, or the presence in a material of certain substances such as water, could be determined by measuring the intensity of beams of high energy photons that are either deflected by or transmitted through the material to be analyzed.

It is significant that, although many applications of nucleonics technology such as those described above have been propounded for use in laboratory or industrial processes, many such methods have proved to be of limited practical utility or have proved to be applicable only in those instances in which relatively high degrees of accuracy and reliability were not required. Because of the degrees of inaccuracy and unreliability inherent in previously disclosed means for chemical and physical analysis through the measurement of the phenomena of nuclear or atomic interactions with radiation, such methods of analysis have not always proved to be satisfactorily applicable in the analysis and control of industrial processes such as petroleum refining. Furthermore the use of combinations of such analytical techniques is often rendered even more impracticable than the use of any such techniques individually because the means previously used to measure the intensity of a neutron beam, or of a beam of a particular type of radiation, are rendered intolerably less precise and less accurate when employed involving the simultaneous use of more than one type of radiation.

The present invention resides in an improved method and apparatus for measuring simultaneously the transmission, through a sample of material to be analyzed, of a beam of neutrons and of a beam of high energy photons, whereby exceptionally precise analytical determinations of the composition and density of the material can be made. In a preferred form of this invention, the intensity of a second beam of substantially monochromatic low energy photons transmitted through a sample of the material to be tested is measured simultaneously with the measurement of the intensity of the neutron and high energy photon beams transmitted through that material to determine the composition and density of the material. It is an additional aspect of this invention that the improved and refined measurements of transmitted radiation can be combined and analyzed continuously, rapidly and automatically by means of a combination of digital computational methods with the analytical methods disclosed herein to provide for rapid and continual analysis and control of the chemical and physical properties of a process stream.

In the accompanying drawings, FIGURE 1 is a diagrammatic representation of the components of apparatus suitable for use with that embodiment of this invention involving the simultaneous measurement of beams of neutrons and high energy photons transmitted through a sample of material to be analyzed.

FIGURE 2 is a diagrammatic representation of the components of apparatus suitable for use with that embodiment of this invention which includes the simultaneous measurement of neutrons, high energy photons and low energy photons, which are transmitted through a sample of material to be analyzed.

For purposes of the discussion contained herein, when a particular material is described as "a material to be analyzed," that statement is intended to indicate that the density of the material and the concentration of at least one element comprising the material are not known and are to be determined.

The term "fast neutrons" is used to describe neutrons having an energy greater than about one electron volt. The term "thermal neutrons" is used to describe those neutrons having an energy of about one electron volt or less. A "thermal neutron distribution" is defined as a group of neutrons in which a substantial number of the neutrons have energies equal to or less than about one electron volt.

As used herein, the term "high energy photon" refers to radiation that has characteristics like the radiation which is emitted from a uranium metal target that is bombarded by beta rays originating from a source of strontium 90 mixed with yttrium 90, with such radiation exhibiting a characteristic energy spectrum having a maximum intensity of approximately 100 kev.

The term "low energy photon" refers to radiation that has characteristics like the radiation which is emitted from an aluminum target that is bombarded by beta rays originating from a source of promethium 147, with such radiation exhibiting a characteristic energy spectrum having a maximum intensity of approximately 20 kev.

For convenience in discussion, the term "radiation" is used herein to indicate not only beams or quantities of photons, but also to indicate beams or quantities of neutrons. Although a group of neutrons in flight is not generally considered to be radiation in the same sense as are beams of photons, the inclusion of neutrons in the term "radiation" is not misleading and simplifies greatly the explanation of the invention described herein.

The term "transmitted radiation," when used generally or with reference to a specific type of radiation, denotes that portion of a beam of radiation that passes through a sample cell containing material to be analyzed in a substantially direct path without taking part in interactions with the atoms or nuclei of the material to be analyzed or with the atoms or nuclei of the material comprising the sample cell itself.

The term "nontransmitted radiation," when used generally or with reference to a particular type of radiation, denotes that portion of a beam of radiation that, while passing through material to be analyzed contained in the sample cell, interacts with nuclei or atoms of the material to be analyzed or with nuclei or atoms of the material comprising the sample cell, and which does not travel through the sample cell in a substantially direct path. The term "nontransmitted radiation" includes also any radiation of a type detected by a particular detecting means, which does, or might, enter that detecting means from any source, or by any path, extraneous to the source and sample cell associated with that detecting means.

The term "count," as used in the context of "radiation count" or "neutron count" or "photon count," denotes the total quantity of radiation, comprising neutrons or photons, detected in a given interval of time and comprises the sum of two detected quantities referred to herein as "signal" and "noise."

The term "signal" denotes that portion of the radiation count that is responsive to the quantity of transmitted radiation passing through a sample cell and entering the detecting means associated with that sample cell. Therefore, the term "signal" does not include that radiation which takes part in one or more interactions with nuclei or atoms contained in the material to be analyzed and which subsequently enters the detecting means, nor does the term "signal" include radiation of a type that is sensed by a particular detecting means but which enters that detecting means from any source or path extraneous to a substantially direct path of travel through the particular sample cell associated with that particular detecting means.

The term "noise" denotes that portion of a radiation count that is responsive to the amount of nontransmitted radiation entering the detecting means from any source or path other than a path of transmission substantially directly through the particular sample cell associated with that particular detecting means. Therefore, the noise sensed by a particular detecting means includes not only the radiation involved in interaction with nuclei or atoms of the material contained in the sample cell associated with that detecting means and which subsequently enters the detecting means, but also includes radiation entering the detecting means from sources extraneous to the apparatus comprising a particular sample cell with its associated source and detecting means.

The term "counting time" is used herein to denote a continuous period of time during which the amount of radiation entering a particular detecting means is recorded thereby.

In accordance with the method of this invention, we have found that the above-indicated benefits can be obtained by measuring the intensity of the beams of neutrons and photons transmitted through the sample while maintaining the magnitudes, refinements and rates of the measurements made within certain specified critical limits. In that regard it is noted that the benefits of this invention are obtained by measuring a beam of neutrons transmitted through the material to be analyzed and maintaining the magnitude of the neutron count desirably at a level of at least about 100,000 counts, preferably measured at a rate of at least about 20,000 counts per minute, while maintaining the ratio of neutron signal to neutron noise preferably at a level of at least about 3.0. Simultaneously, the intensity of a beam of high energy photons transmitted through the material is measured while the magnitude of the high energy photon count is maintained desirably at a level of at least 100,000 counts, preferably measured at a rate of at least about 20,000 counts per minute, while maintaining the ratio of signal to noise for the high energy photon preferably at a level of at least about 10.0. In a preferred form of this invention, the intensity of a beam of low energy photons transmitted through the material is measured simultaneously with the measurement of transmitted neutrons and transmitted high energy photons while the magnitude of the low energy photon count is maintained desirably at a level of at least about 100,000 counts, preferably measured at a rate of at least about 20,000 counts per minute, while maintaining the ratio of signal to noise for the low energy photon, preferably at a level of 10.0.

In a highly preferred embodiment of this invention, the neutron count is maintained within the range of from about 20,000 to about 200,000 counts per minute and the ratio of signal to noise in the neutron count is maintained within the range of from about 3.0 to about 10.0. Simultaneously therewith, the high energy photon counting rate is maintained preferably within the range of from about 20,000 to about 200,000 counts per minute and the ratio of signal to noise in the high energy photon count is maintained within the range of from about 10.0 to about 50.0. In those instances wherein the measurement of transmitted low energy photons is simultaneously combined with the measurement of transmitted neutrons and transmitted high energy photons, the counting rate of the low energy photon is maintained preferably within the range of from about 20,000 to about 200,000 counts per minute and the ratio of signal to noise in the low energy photon count is maintained within the range of from about 10.0 to about 50.0.

In accordance with the process stream radiation analyzer apparatus of this invention there is provided, in combination, a continuous sample conduit in fluid communication with a process stream conduit for removing from the process stream a sample of the material to be analyzed. The sample conduit includes, as separate but integrated parts thereof, a neutron sample cell, a high energy photon sample cell and, in certain instances, a low energy photon sample cell. A neutron source capable of providing a substantially thermal distribution of neutrons is positioned adjacent, and spaced from, one side of the neutron sample cell. Neutron detecting means is positioned adjacent and spaced from the side of the neutron sample cell opposite the neutron source and is connected to data conversion means adapted to amplify and discriminate the neutron counting data and to convert that data to an intelligible form. Neutron shielding and collimating means are interposed in the neutron apparatus between the sample cell and the detector and between the sample cell and the source. In a preferred embodiment of the apparatus of this invention, a moderating plug of neutron moderating material is interposed between the neutron source and the sample cell.

The apparatus suitable for use with the process of this invention includes also a high energy photon source positioned adjacent and spaced from one side of the high energy photon sample cell and detecting means for the high energy photons positioned adjacent and spaced from the side of that sample cell opposite the high energy photon source. The high energy photon detecting means is connected to data conversion means adapted to amplify and discriminate the counting data and to convert that data into an intelligible form. Shielding and collimating means for high energy photons are mounted in the apparatus between the high energy photon source and the sample cell and between the detector and the sample cell. Additional shielding means are interposed between the high energy photon detector and the neutron source to substantially prevent sensing by the high energy photon detector of high energy photons emanating from the neutron source.

In the embodiment of this invention in which the transmission of low energy photons through the material is also measured, the apparatus includes a source of substantially monochromatic low energy photons positioned adjacent and spaced from one side of the associated sample cell and includes low energy photon detecting means adjacent and spaced from the side of that sample cell opposite the source. The low energy photon detecting means is connected to data conversion means adapted to amplify and discriminate the counting data and to convert that data into an intelligible form. Collimating and shielding means for low energy photons are mounted in that apparatus between the sample cell and the source and between the sample cell and the detector. Additional shielding means are interposed between the low energy photon apparatus and the high energy photon apparatus and between the low energy photon apparatus and the neutron apparatus to prevent substantially measurement by the low energy photon detecting means of low energy photons emanating from sources extraneous to that apparatus and to prevent substantially measurement by the high energy photon detecting means of high energy photons emanating from the low energy photon source.

All of the previously described structural elements of the apparatus of this invention comprising the neutron apparatus and both photon apparatus, with the possible and optional exception of all or part of the data conversion means associated with each of the radiation apparatus, is surrounded by heating and neutron moderating means constructed and arranged to thermalize non-transmitted neutrons and to maintain the temperature of the material to be analyzed in each of the sample cells substantially the same and substantially constant during the use of the method and apparatus of this invention.

In accordance with the concept of this invention, the structural elements of the neutron apparatus are constructed and arranged such that, while measuring a neutron count of at least about 100,000, preferably measured at a rate of at least about 20,000 counts per minute, the ratio of signal to noise in the neutron count is maintained at a level preferably of at least about 3.0. The structural elements of the high energy photon apparatus are constructed and arranged such that, while measuring a count of at least about 100,000, preferably measured at a rate of at least about 20,000 counts perminute, the ratio of signal to noise in that count is maintained at a level preferably of at least about 10.0. Similarly, the structural elements of the low energy photon apparatus are constructed and arranged such that, while measuring a count of at least about 100,000, preferably measured at a rate of at least 20,000 counts per minute, the ratio of signal to noise in that count is maintained at a level preferably of at least about 10.0.

It has been found that the intensity of radiation measured by a particular detector after transmission of the radiation through a material is determined by the interrelation of many independent variables in the physical system involved. Those independent variables include the rate of emission of radiation from the source employed, the energy level of the radiation passing through the material, the nature and atomic structure of the elements comprising the unknown material, the density of the material, and the geometry of the physical system as determined by the construction and the arrangement of the apparatus employed. Because of the complexity of the interrelationship among those variables, the measurement of the transmission of radiation through a material cannot be accurately described quantitatively by purely analytical mathematical expressions, but is measured by empirical methods founded upon the statistical probability of the occurrence in the material of nuclear atomic, or subatomic interactions such as absorption, scattering, or deflection of the radiation passing through the material and upon the statistical characteristics of the couning mehod employed.

In accordance with this invention it has been discovered that very precise and accurate measurements of the intensity of transmitted radiation can be obtained and used to determine the concentration of hydrogen directly with a precision of 0.02 percent by weight (standard deviation) and that such measurements can be made with an accuracy of at least 0.03 percent difference from the actual value if the minimal requirements described previously are observed regarding the magnitude of the radiation counts and the relative magnitudes of the detected signal and noise. It has also been discovered that, if the minimal radiation counting requirements of the method of this invention are observed, the density of an unknown material can be determined with a precision of 0.001 gm./cc. (standard deviation) and that such measurements can be obtained with an accuracy of at least 0.30 percent difference from the actual value. Because there are definite practical limitations involved in producing high counts of radiation and in reducing noise to extremely low intensities, it is generally desirable that the radiation counts, the counting rates, and the ratios of signal to noise be maintained within the preferred ranges set forth above.

The manipulative steps of the method are substantially the same regardless of the composition of the material being analyzed and those steps are described herein with reference to the method employed in determining the density of, and the concentration of, hydrogen in a process stream containing hydrocarbons. The method comprises diverting a sample stream from a process stream of material to be analyzed and flowing the sample stream through the radiation analyzer apparatus while transmitting, through sample cells filled with the material, a neutron beam comprising a thermal distribution of neutrons and a beam of high energy photons. The orientation and position of the material sample between each radiation source and its associated detecting means is such as to assure that the radiation counts and the ratios of signal to noise are within the limitations specified herein.

When the methods of measuring various types of radiation are combined to provide for the simultaneous measurement of various types of radiation such as the measurement simultaneously of the transmission of neutrons and high energy photons and, in proper instances, of low energy photons, the production of each particular radiation source of more than one type of radiation results in the detection by a particular detecting means of intolerably high noise levels unless means are employed in accordance with the method of this invention, to prevent or reduce substantially the sensing by a particular detecting means of radiation emanating from other sources in the analyzer apparatus. For example, the high energy photon detector must be properly shielded to prevent detection of high energy photons emanating from the low energy photon source and must be shielded from the neutron source to prevent activation of the high energy photon detector by neutrons entering that detector. The low energy photon detector must be properly shielded to prevent detection of low energy photons produced by the other radiation sources. The methods and apparatus required to permit simultaneous measurement of different types of radiation with sufficient accuracy and precision to produce reliable chemical and physical analyses of process streams have been determined in accordance with this invention and are disclosed herein.

The method of this invention can be explained more clearly with reference to the use of suitable apparatus employed with the method, such as the apparatus shown in the accompanying drawings, wherein FIGURE 1 represents apparatus suitable for use with the embodiment of this invention in which measurement of neutrons and high energy photons transmitted through a sample stream diverted from a process stream of material containing hydrocarbons is employed to determine the density of the material and the concentration of hydrogen therein.

The analyzer apparatus is indicated generally in FIGURE 1 by reference numeral 10 and comprises an external housing 12 containing a body of material 14 capable of moderating neutrons and of maintaining a substantially constant temperature within the analyzer apparatus. Suitable moderating and heating materials are fluids such as water or oil, as shown in FIGURE 1. Means to heat the moderating and heating material are indicated diagrammatically in FIGURE 1 as heating coils 16, and means to circulate the moderating and heating material through the interior of the analyzer are shown in FIGURE 1 as stirring means 18.

A sample conduit 20, in fluid communication with a process stream conduit (not shown in the drawing), is mounted within housing 12. Sample conduit 20 includes heat exchanger coil 22, neutron sample cell 24 and high energy photon sample cell 26. Sample cells 24 and 26 and sample conduit 20 are constructed of a material, such as aluminum, that has an atomic and nuclear structure characterized by a relatively low probability of interaction with radiation passing therethrough. Sample cells 24 and 26 can be of unitary construction with sample conduit 20, but, more conveniently, the sample cells comprise separate structural elements of the analyzer apparatus and are adapted to be connected in sample conduit 20 as an integral part thereof.

It is an important feature of the apparatus employed that the thickness of the material sample contained in the sample cell is sufficient to provide adequate interaction with the radiation passing therethrough to afford an accurate representation of the density and composition of the material. On the other hand, it is desirable to use as small a sample as practicable to minimize the volume of the sample stream diverted from the process stream and to minimize the required strength of the various radiation sources employed and the required sensitivities of the various radiation detectors employed. In that regard, the thickness of a sample cell is defined as the perpendicular distance between the inner walls of the cell. The thickness of the neutron sample cell is desirably within the range of from about 0.20 inch to about 0.60 inch, and the thickness of the high energy photon sample cell is in the range of from about 2.0 inches to about 6.0 inches.

A neutron source receptacle 28 extends inwardly from the outer upper surface of housing 10 downwardly through the housing to a position adjacent and spaced from neutron sample cell 24. A neutron source 30 is encased within receptacle 28 at the level of sample cell 24, and the space in receptacle 28 above neutron source 30 is substantially filled with neutron thermalizing material 32 which can be composed of paraffin, polystyrene, graphite or any other material capable of thermalizing neutrons.

Neutron source 30 can be any means capable of emitting neutrons such as a nuclear reactor, a cyclotron, a neutron accelerator, or a radioactive source material containing a mixture of substances, at least one of which is radioactive. The radioactive source materials are preferred for use with this invention because of the stability of the rate of neutron emission from such materials and because of their compactness and ease of handling. Examples of suitable radioactive source materials are a mixture of polonium and beryllium, which has a half-life of 138 days and a rate of emission of $2.5 \times 10^6$ neutrons per curie per second, and a mixture of radium and beryllium, which has a half-life of 1622 years and a rate of $1.3 \times 10^7$ neutrons per curie per second.

Because the number of neutrons emitted in a given time period from a radioactive source material is a statistical phenomenon, it is desirable that the radioactive neutron source material be capable of providing a relatively high rate of neutron emission that is substantially constant for long periods of time, and at least during the counting time employed. It is also desirable that the neutron source have a relatively low tendency to emit photons. Therefore, a preferred radioactive source material is a mixture of plutonium 239 and beryllium, which has a half-life of 24,600 years and a rate of neutron emission of $1.7 \times 10^6$ neutrons per curie per second. Another preferred radioactive source material is a mixture of americium and beryllium, which has a half-life of 458 years and a rate of neutron emission of $2.0 \times 10^6$ neutrons per curie per second. In any event, the particular neutron source employed does not constitute a critical element of this invention as long as the source is capable of providing a substantially constant rate of neutron emission that provides at least the minimum desirable neutron count at the neutron detector. A suitable rate of neutron emission from the source has been found to be one that is equal to about $5 \times 10^6$ neutrons per second. Thus with a mixture of plutonium 239 and beryllium, for example, it is desirable that at least about 3.0 curies of the radioactive source material be employed.

A neutron conductor tube 34 having a longitudinal passage 36 therethrough extends from the neutron source receptacle 28 to sample cell 24. In a preferred embodiment of this invention, a neutron moderating plug 38 is encased within tube 34 adjacent receptacle 28. Neutron moderating plug 38 can comprise any material capable of scattering and thermalizing the neutrons emitted from source 30 in the direction of sample cell 24. Examples of such materials that are suitable for use with this invention are heavy water, graphite, paraffin and polystyrene. Paraffin and polystyrene are preferred because their physical state provides greater ease of handling. As is the case with the neutron source, the choice of any particular material for moderating plug 38 is not critical to the inventive concept disclosed herein; therefore, moderating plug 38 can be constructed of any material, or the moderating plug can be omitted, as long as the beam of neutrons passing through the material in sample cell 24 contains a distribution of neutrons substantially within the range of thermal energies. In some instances, failure to use any moderating plug might increase the noise detected by the neutron detecting means to an intolerable intensity. In other instances, the use of too large a moderating plug 38 might reduce the intensity of the neutron beam, and of the measured neutron signal, to an undesirable degree. In many embodiments of this invention, the use of a moderating plug 38 having a length of from about one to about three inches has proved satisfactory.

A detector 40 for thermal neutrons is mounted within housing 10 adjacent and spaced from sample cell 24. Detector 40 can be any means or apparatus suitable for sensing neutrons such as a proportional counter lined with boron or lithium or a proportional counter filled with gaseous boron trifluoride or with the isotope of helium having an atomic weight of three. Detector 40 has therein a sensing element 42, connected to a high voltage power supply 44 that produces a change in electrical voltage responsive to interaction of thermal neutrons with the gas in the detector.

The neutron detecting means shown comprises detector 40 in combination with electronic amplification and discrimination means adapted to amplify the output responses produced by detector 40 and to discriminate against the counting of radiation other than thermal neutrons. In FIGURE 1, the electrical means used to convert the output response from sensing element 42 is represented diagrammatically as a preamplifier 46 connected to sensing element 42, a combination amplifier and discriminator 48 connected to preamplifier 46 and scaler 50 connected to amplifier-discriminator 48. The particular type of amplification, discrimination and response conversion apparatus employed is not critical to the inventive concept of the apparatus described herein, and any means suitable for producing a visual digital record from the output response of sensing element 42 can be used without departing from the concept of this invention.

In accord with this invention, neutron collimating and shielding means are interposed between sample cell 24 and source 30 and between sample cell 24 and detector 40 to provide a substantially parallel beam of neutrons entering sample cell 24 and to reduce the number of nontransmitted neutrons sensed by detector 40. As shown in FIGURE 1, the neutron shielding and collimating means comprises a cylindrical lead jacket 51 surrounding receptacle 28 and the end of tube 34 connected thereto is constructed and arranged to absorb photons emitted by neutron source 30 and to reduce the number of photons entering neutron source 30 from other radiation sources. A neutron shield 52, made of material such as cadmium or Boral that is capable of absorbing neutrons, is mounted on conductor tube 34 near sample cell 24 and has a length or diameter substantially larger than the dimensions of sample cell 24. A first set of neutron collimators 54 is secured between sample cell 24 and neutron shield 52 and consists of one or more annular rings made of a material such as cadmium or Boral that is capable of absorbing neutrons. Each ring has a central opening therein substantially equal to the transverse dimension of passage 36 through tube 34.

A second set of collimators 56 is mounted in the neutron apparatus between sample cell 24 and detector 40 to shield the detector from entry thereinto of nontransmitted neutrons and comprises one or more annular rings constructed of material capable of absorbing neutrons. Collimators 56 have a central passage therethrough having a diameter substantially equal to the diameter of the openings in collimators 54. The diameters of passage 36 in tube 34 and of the openings in the collimators desirably are substantially equal to the sensitive diameter of the entry to the neutron detector 40 to assure the effective and reliable operation of the detector in sensing neutrons transmitted through the material in sample cell 24.

In the analyzer apparatus 10, the source for producing high energy photons comprises a source receptacle 58 extending from the upper surface of outer housing 12 downwardly within the interior of housing 12 to a level adjacent the upper end of the high energy photon sample cell 26 and spaced therefrom. The lower end of receptacle 58 is attached to and opens into a mounting tube 60. Mounting tube 60 is preferably constructed of lead or a shielding material adapted to absorb high energy photons. A source of beta radiation 62 is mounted in receptacle 58 just above the opening of receptacle 58 into mounting tube 60. Beta ray source 62 is secured to the lower end of an aluminum rod extending upwardly through and secured in receptacle 58. The source of beta radiation can be a mixture of strontium 90 and yttrium 90.

A uranium metal target 64 is mounted within mounting tube 60 at an angle of approximately 45° with a line through the center of beta ray source 62 and at an angle also of 45° with a line through the center of mounting tube 60 and sample cell 26. Radiation from beta ray source 62 is directed to uranium target 64 and causes the emission of high energy photons through mounting tube 60 toward sample cell 26.

In lieu of the source of high energy photons shown in FIGURES 1 and 2, that source can also consist of materials containing such radioactive substances as radium, cobalt 60, tantalum 182, iridium 192, or cesium 137; however, the use of such sources might require the use of a much thicker sample cell. Any source of high energy photons is suitable for use with this invention as long as it is capable of transmitting, in combination with other apparatus employed, a beam of high energy photons within the desired energy spectrum and of sufficient intensity at the detector to comply with the minimum counting requirements set forth herein. Generally, it is desirable that the source of high energy photons is capable of producing photons within the energy spectrum of from about 40 kev. to about 100 kev. High energy photon sources found to be suitable for use with the apparatus described herein have energies of approximately 50 kev.

A high energy photon detector 66, comprising a NaI(Tl) crystal 68 and a photomultiplier tube 70, is mounted within mounting tube 60 adjacent and remote from the side of sample cell 26 opposite uranium target 64. Any radiation detecting means is suitable as long as it is capable of detecting photons within the energy spectrum employed. The high energy photon detecting means includes a high voltage power supply 72 connected to detector 66 and a combination amplification and discrimination means 74 also connected to detector 66. The discrimination means of amplifier-discriminator 74 are adapted to enable the counting of high energy photons while discriminating against the counting of other radiation that lies below the specific energy spectrum employed for high energy photons. A scaler 76 connected to amplifier-discriminator means 74 completes the apparatus employed to convert the signal detected by detector 66 into intelligible output data.

An important aspect of this invention is the minimizing of nontransmitted radiation that is included in the high energy photon count sensed by detector 66. Important elements of structure in the apparatus that are employed to attain that objective are shown in FIGURE 1 as high energy photon collimators 78 and 80, shield 82, cadmium sleeve 83, and low energy photon filter 79. Collimators 78 and 80 comprise lead tubes or a plurality of lead rings capable of absorbing photons and are set on either side of sample cell 26. The interposition of collimator 78 assures the direction toward sample cell 26 of a substantially parallel beam of photons, and the interposition of collimator 80 between sample cell 26 and detector 66 assures the direction to detector 66 of a substantially parallel beam of transmitted photons from sample cell 26. Collimators 78 and 80 have longitudinal passages therethrough having cross sectional dimensions substantially equal to the sensitive cross section of the entry to detector 66 to assure the effective counting of the radiation transmitted through sample cell 26. Cadmium sleeve 83 surrounds mounting tube 60 adjacent detector 66 to shield the sodium iodide crystal of detector 66 from radiation originating from sources other than the high energy photon source.

Low energy photon filter 79 comprises a disk or plug of a material, such as copper or other metal capable of absorbing photons. Shield 79 is mounted within collimator 78 in the end thereof adjacent uranium target 64 to absorb low energy photons that might be emitted from target 64 in the direction of sample cell 26. The absorption of low energy photons by shield 79 prevents the passage of those photons to detector 66 and thereby reduces substantially the magnitude of the noise comprising part of the high energy photon count.

Photon shield 82 comprises a lead plate secured to the interior side wall of housing 12 and extending inwardly between sample cell 26 and the end of mounting tube 60 beneath detector 66 to shield detector 66 from non-transmitted photons emanating from the neutron apparatus, and especially from neutron source 30. Shield 82 has a thickness determined by such factors as the nature and strength of the neutron source, the geometry and spacing of the structural elements within analyzer 10, and so forth; therefore, no general specification for the dimensions of shield 82 can be prescribed. However, lead plates having thicknesses within the range of from about one inch to about two inches have proved satisfactory in use with the other apparatus described herein. It has been found in accordance with this invention that such shielding and collimation is an important factor in attaining the refinements and limitations involved in the transmitted photon counting procedure when transmitted photons are measured simultaneously with transmitted neutrons with the radiation transmission devices being in close proximity to one another.

In the use, with the process of this invention, of apparatus shown in FIGURE 1, sample conduit 20 is opened to fluid communication with the process stream conduit, not shown in the drawings. Because the velocity of the sample stream in sample conduit 20 through analyzer apparatus 10 has no significant effect upon the accuracy and precision of the radiation counting procedures involved herein, the sample stream can be continuously moving during the analysis of the sample stream or the sample stream can be maintained stationary within analyzer apparatus 10. The choice of either procedure is a matter of convenience as determined by the requirements of any particular analysis procedure.

When sample conduit 20 is filled with the material to be analyzed, the temperature of the material inside housing 12 is determined by extraneous means not shown in the drawing to ascertain that, during the analysis, the temperatures of the material in the sample cells remain substantially the same and substantially constant. The proper temperature to be maintained is determined by such factors as the nature of the material being analyzed, the temperature of the process stream, and so forth. When the temperature in analyzer 10 has been stabilized, timer 84, which is connected to scalers 50 and 76, is set in operation. Timer 84 is set to control the operation of detectors 40 and 60 for the particular counting time employed in a given analysis.

The total counting time is not a critical element of this invention except in the respect that the total counting time must be sufficient to allow attainment of the minimum specified radiation counts described above. It is desirable that, when a series of radiation counts are to be performed, the counting times employed successively be preferably equal for purposes of comparison of the data and results obtained. However, if unequal counting times are used for any reason, they can be adjusted for comparison by calculating, for each radiation count obtained, an average count for a fixed arbitrary unit time that is the same for each radiation count and comparing those values, or equivalent multiples of each of those values, for each radiation count obtained. At the end of each counting period, the total neutron count is read from scaler 50 and the total high energy photon count is read from scaler 76. Preferably, the output data from detectors 40 and 60 are fed through their respective amplifier-discriminator means 48 and 74 to a digital computer adapted to calculate the density of the sample stream and the concentrations of hydrogen and carbon contained therein.

Whether the radiation counting data is reproduced visually on scalers 50 and 76 and/or is read into a digital computer, the density of the sample stream and the concentration of hydrogen therein is obtained by substitution of the radiation counts in the following equations:

$$x = A_1 \ln (I-\alpha) + A_2 \ln (J-\beta) + A_3 \quad (1)$$

$$y = B_1 \ln (I-\alpha) + B_2 \ln (J-\beta) + B_3 \quad (2)$$

$$\rho = x + y \quad (3)$$

$$W_H = \frac{x}{\rho} \quad (4)$$

$$W_C = \frac{y}{\rho} \quad (5)$$

Where $I$ = the total neutron count obtained during a given counting time, $J$ = the total high energy photon count obtained during the counting time, $\alpha$ = a factor which takes into account the noise included in the total neutron count, $\beta$ = a factor which takes into account the noise included in the total high energy photon count, $\rho$ = the density of the material in the sample stream, $x$ and $y$ equal, respectively, the weights per unit volume of hydrogen and carbon contained in the sample stream, $W_H$ and $W_C$ equal, respectively, the weight fractions of hydrogen and carbon contained in the sample stream and $A_1, A_2, A_3, B_1, B_2$ and $B_3$ = the required combined physical and unit conversion constants.

Calibration of the apparatus employed with this invention involves the determination of the values of $\alpha$, $\beta$, and of the constants $A_1, A_2, A_3, B_1, B_2,$ and $B_3$, of the equations. These values are determined by passing through the analyzer a number of standard materials of known composition and density at those conditions in the analyzer apparatus 10 which will subsequently be employed during the analysis of material of unknown composition and density. When the composition and density of an unknown hydrocarbon material is to be determined, the calibration is performed using the data from a series of hydrocarbon standard materials (usually 10 to 15) ranging from 7.74 percent hydrogen by weight for benzene to 16.77 percent hydrogen by weight for pentane. The standard materials consist of pure grade compounds of purity greater than 99 percent and are checked periodically for purity on a gas chromatograph. For each standard material the total neutron count (I) and the total photon count (J) is determined. A value of $\alpha$ is then assumed and a set of values of $A_1'$ and $A_2'$ is determined which gives the minimum sum of the squares of the differences between the quantities on opposite sides of the equal sign in the equation $$\frac{I-\alpha}{I_s-\alpha} = A_1'(x-x_s) + A_2'(y-y_s) \quad (6)$$

where the subscript $s$ refers to a specific standard used for normalization (cumene is usually employed for this purpose). Additional values of $\alpha$ are assumed and a set of values for $A_1'$ and $A_2'$ is calculated for each value of $\alpha$. Then each set of values for $\alpha$, $A_1'$, and $A_2'$ is used to calculate the weight fraction of hydrogen for each of the calibration standards employing Equations 3, 4, 6, and finally, the best set of calibration constants is selected on the basis of the criterion that the sum of the squares of the relative differences between the true and calculated values of the weight fractions be a minimum.

In a similar manner, a value of $\beta$ is assumed and a set of values of $B_1'$ and $B_2'$ is determined which gives the minimum sum of the squares of the differences between the quantities on opposite sides of the equal sign in the equation $$\frac{J-\beta}{J_s-\beta} = B_1'(x-x_s) + B_2'(y-y_s) \quad (7)$$

Additional values of $\beta$ are assumed and a set of values for $B_1'$ and $B_2'$ is calculated for each value of $\beta$. Values of hydrogen weight fraction are then computed using Equations 3, 4, 7, and the best set of values for $\beta$, $B_1'$ and $B_2'$ selected on the basis of the criterion that the sum of the squares of the relative differences between the true and calculated values of the weight fractions be a minimum.

The calibration constants are then computed from the following relations:

$$A_1 = \frac{B_2'}{A_1'B_2' - A_2'B_1'} \quad (8)$$

$$B_1 = \frac{-B_1'}{A_1'B_2' - A_2'B_2'} \quad (9)$$

$$A_2 = \frac{-A_2'}{A_1'B_2' - A_2'B_2'} \quad (10)$$

$$B_2 = \frac{A_1'}{A_1'B_2' - A_2'B_2'} \quad (11)$$

$$A_3 = -A_1 \ln (I_s - \alpha) - A_2 \ln (J_s - \beta) + A_1(A_1'x_s + A_2'y_s) + A_2(B_1'x_s + B_2'y_s) \quad (12)$$

$$B_3 = -B_1 \ln (I_s - \alpha) - B_2 \ln (J_s - \beta) + B_1(A_1'x_s + A_2'y_s) + B_2(B_1'x_s + B_2'y_s) \quad (13)$$

In the practical operation of this instrument to analyze a sample material, an on-line digital computer is employed to calculate the weight fraction hydrogen and the density from Equations 1–5. The constants $A_1$, $A_2$, $A_3$, $B_1$, $B_2$, $B_3$, $\alpha$ and $\beta$ are stored in advance in the computer memory. Since $A_1$, $A_2$, $B_1$ and $B_2$ are related to neutron cross sections and X-ray mass attenuation coefficients only, their values are not altered by instrumental drift and need only be determined once for a given instrument. Furthermore, $\alpha$ and $\beta$ are not affected by normal instrument drift because they are small compared with I and J. Field calibration, to compensate for long term instrumental drifts, is accomplished by computing new values for $A_3$ and $B_3$ from Equations 12 and 13 using data obtained from a calibration standard. A special program for the computer causes the computation to be performed and the corrected values for $A_3$ and $B_3$ to be stored automatically in the proper places in the computer memory.

FIGURE 2 of the accompanying drawing shows apparatus suitable for that embodiment of this invention wherein simultaneous with the measurement of the transmitted neutrons and high energy photons through a material to be analyzed, there is measured also the transmission through the material of a substantially monochromatic beam of low energy photons. This embodiment and the apparatus suitable for use therewith is useful when it is desired to determine not only the sample density and the concentration of hydrogen in it, but also the concentration of a third component or element, such as sulfur.

FIGURE 2 depicts all of the apparatus shown in FIGURE 1 in combination with low energy photon transmission apparatus comprising a sample cell 86 constituting an integral part of sample stream conduit 20. As was the case with the other sample cells, the low energy photon sample cell is desirably as small as is practicable while containing a quantity of the material to be analyzed adequate to provide a sufficiently high probability of interaction with low energy photons passing therethrough to assure a reliable determination of the density and composition of the material contained in the sample cell 86.

The thickness of the sample cell 86 is determined by such factors as the nature and strength of the low energy photon source, the sensitivity of the detecting means, and the nature of the material being analyzed. Good analyses have been made with sample cells having thicknesses within the range of from about one-half inch to about one inch.

A mounting tube 88 enclosing sample cell 86 is secured within the outer housing 12 of analyzer apparatus 10. A receptacle 90, integral with the mounting tube 88, extends from the upper surface of outer housing 12 downwardly to a level adjacent to and spaced from sample cell 86. Low energy photon source 92 is enclosed within the lower portion of receptacle 90. The space in receptacle 90 above source 92 is substantially filled with a plug of aluminum 94 adapted for inserting and removing source 92 in receptacle 90.

Any source of low energy photons is suitable for use with this invention as long as it is capable of providing a stable and substantially monochromatic beam of photons within an energy spectrum of from about 10.0 kev. to about 30.0 kev. Sources found suitable for use with the other apparatus described herein have provided radiation substantially of about 20.0 kev. It is desirable also that source 86 does not emit an excessive amount of high energy photons while emitting a low energy photon beam of sufficient intensity to provide the minimum count and counting rates prescribed for use with this invention.

The low energy photon source can comprise mixtures of materials containing radioactive substances capable of emitting low energy photons, examples of such materials are iron-55 and a mixture of aluminum and promethium-147.

A low energy photon detector 96 is secured in mounting tube 88 adjacent and spaced from the side of sample cell 86 remote from source 92. Detector 96 can be any detecting means capable of sensing photons within the energy spectrum specified above as suitable for use. Detector 96 contains a sensing element 98 connected to a high voltage power supply 100 and connected also to combination amplifier-discriminator means 102 which is adapted to permit the amplification and sensing of low energy photons while discriminating against the sensing by the detector 96 of other radiation. A scaler 104 is connected to amplifier-discriminator means 102 and is adapted to convert the output data of detector 96 into intelligible data, preferably in digital form. Scaler 104 is connected to timer 84 which is adapted to synchronize the operations of the neutron apparatus, the high energy photon apparatus and the low energy photon apparatus of analyzer 10. As was the case with the neutron transmission apparatus and the high energy photon transmission apparatus, the total low energy photon count can be read from scaler 104 and, alternatively or simultaneously, the output data from detector 96 can be fed to a digital computer together with the data from the neutron and high energy photon detectors for the calculation of the density and composition of the material under analysis.

Apparaus employed with the process of this invention, wherein it is important to observe the specific minimal requirements regarding magnitude of the radiation count, the radiation counting rates and the signal to noise ratios, desirably comprises means adapted to shield the individual radiation detectors. Structural elements adapted to attain the objectives of shielding and collimating the low energy photon beam are shown in FIGURE 2 as including collimators 106 and 108 which can comprise discrete lead tubes, or pluralities of lead rings, having a central passage therethrough with a diameter substantially the same as the effective diameter of the opening or entry to detector 96. Collimator 108 is interposed between source 92 and sample cell 86 to assure that a beam of substantially parallel low energy photons is directed toward sample cell 86, and collimator 106 is interposed between sample cell 86 and detector 96 to assure that a beam of substantially parallel transmitted low energy photons is directed from sample cell 86 to detector 96.

Shielding means 110 and 112 are mounted externally of mounting tube 88 to substantially reduce the interchange of radiated energy between the separate radiation sources and detectors in analyzer 10. The thickness of these shields is determined by such factors as the amounts of radiation produced in the respective sources, the sensitivity of the detectors, the nature and operating range of the discriminator means and the relative spacing and orientation of the apparatus with respect to each other. Shield plates 110 and 112 having a thickness of about one to two inches of lead have provided satisfactory shielding with apparatus as described herein. However, the shielding required for any specific apparatus must be separately determined to ensure that adequate shielding will be obtained.

When this embodiment of this invention is employed wherein the transmission of low energy photons is measured simultaneously with the transmission of high energy photons and neutrons through a sample of material to be analyzed to determine the concentration of additional components of the material under analysis, an expansion of the mathematical equations which are solved simultaneously, with the values of the radiation counts substituted therein, is necessitated to determine the density and composition of the material. The equations employed with this embodiment of the invention are as follows:

$$x = D_1 \ln(I-\alpha) + D_2 \ln(J-\beta) + D_3 \ln(K-\gamma) + D_4 \quad (14)$$

$$y = E_1 \ln(I-\alpha) + E_2 \ln(J-\beta) + E_3 \ln(K-\gamma) + E_4 \quad (15)$$

$$z = C_1 \ln(I-\alpha) + C_2 \ln(J-\beta) + C_3 \ln(K-\gamma+C_4 \quad (16)$$

$$\rho = x + y + z \quad (17)$$

$$W_H = \frac{x}{\rho} \quad (18)$$

$$W_C = \frac{y}{\rho} \quad (19)$$

$$W_S = \frac{z}{\rho} \quad (20)$$

Where all of the terms common to Equation 1 through 5 and Equations 14 through 20 have the definitions assigned to them in Equations 1 through 5, and where, in addition:

$K=$ the total low energy photon count measured during the counting time;

$\gamma=$ a factor which takes into account the noise included in the total low energy photon count;

$z=$ the weight per unit volume of a third component, such as sulfur, contained on the sample stream;

$W_S=$ the weight fraction of a third component, such as sulfur, contained in the sample stream, and $D_1$, $D_2$, $D_3$, $D_4$, $E_1$, $E_2$, $E_3$, $E_4$, $C_1$, $C_2$, $C_3$, and $C_4=$ physical and unit conversion constants determined by the units employed combined with certain required physical constants.

Similar to the calibration procedure described above, the calibration of apparatus as shown in FIGURE 2, involves the flowing through, or filling, of sample cell 20 with materials containing known concentrations of the three components of interest, such as carbon, hydrogen and sulfur, and having known densities. The numerical values of $x$, $y$ and $z$, and of the D's, E's and C's, are determined by the particular calibration materials chosen, and the values of I, J and K are determined by measurement of the transmitted radiation under conditions equivalent to those under which analysis of unknown materials will be made. The calibration procedure is the same as that described for the process employing simultaneous measurement of transmitted neutrons and high energy photons, except that the calibration procedure is expanded to include determination of such quantities as $\gamma$ and the constant C's.

An actual physical embodiment of a process stream radiation analyzer in accordance with this invention comprises the following structural elements. Outer housing 12 consists of a steel tank having an ovoid shape with a major transverse axis of 44 inches, a minor transverse axis of 34 inches, and a vertical axis of 35 inches. The tank is filled with transformer oil as the heating medium and the ovoid shape of the tank is adapted to minimize the volume of oil required while providing at least about 18 inches of oil between the neutron source and the wall of the tank to act as an effective neutron moderator.

Neutron source 30 consists of ten curies of a mixture of plutonium 239 and beryllium. Moderating rod 32 is made of polystyrene, and neutron conductor tube 34 is constructed of aluminum and has a nominal diameter of two inches. Moderating plug 38 consists of a three-inch cylinder of polystyrene having a diameter substantially equal to the inner diameter of tube 34.

Neutron detector 40 comprises a $He^3$ proportional counter having (as shown in FIGURE 1) an inner cylindrical stainless steel liner 114 covered with a cadmium shield 116. Steel liner 114 forms a chamber 118 containing the gaseous $He^3$. Detector 40 has an outer casing 120 of aluminum that forms an annular chamber 122 with cadmium shield 116. Chamber 122 is filled wtih boron carbide chips 124 which, in combination with cadmium shield 116, absorb neutrons and reduce the number of non-transmitted neutrons that enter detector 40 to contact sensing element 42.

Sample stream conduit 20 comprises stainless steel tubing having a nominal diameter of 0.25 inch, and heat exchanger 22 is unitary with sample stream conduit 20 and comprises a series of 16 loops formed in sample conduit 20. Neutron sample cell 24 is constructed of aluminum with a wall thickness of 0.08 inch. The sample contained therein has a thickness of 0.2 inch. Neutron sample cell 24 has a sample chamber diameter of approximately two inches which is slightly larger than the diameter of the entry of detector 40 which is equal to 1.86 inches. Neutron collimators 54 and 56 and neutron shield plate 52 have central passages extending therethrough with diameters substantially equal to 1.86 inches, the effective diameter of the entry to detector 40.

With the specific neutron source that was used with the present apparatus, and with the materials for analysis and calibration that were used with this specific apparatus and which will be discussed more fully below, the relative spacing among various elements of the neutron apparatus employed herewith comprised a distance of seven inches between the center of neutron source 30 and the center of neutron sample cell 24, a distance of three inches between the center of sample cell 24 and the end of moderating plug 38 adjacent sample cell 24, and a distance of one and one-half inches between the center of sample cell 24 and the entry to neutron detector 40.

In the high energy photon transmission apparatus, the beta ray source 62 consists of six millicuries of strontium-90, and the uranium metal target 64 consists of a solid body of uranium metal having a width of 0.75 inch, a length of 1.5 inches and a thickness of 0.0156 inch, with the uranium target set at the above described angles of 45° with lines passing through the center of sample cell 26 and the center of beta ray source 62. Sample cell 26 is constructed of aluminum having a wall thickness of 0.08 inch and providing a chamber therein with a sample thickness of three inches.

Collimator 78 consists of a lead tube 1.0 inch long and collimator 80 consists of a lead tube 1.0 inch long, both collimators 78 and 80 having internal diameters of substantially 1.5 inches, equal to the effective diameter of the entry into detector 66. Low energy photon shield 79 consists of a copper plate having an effective diameter of 1.5 inches and a thickness of $\frac{1}{64}$ inch. Mounting tube 60 comprises a lead tube having a length equal to 14.0 inches and a wall thickness of 0.25 inch with an internal diameter of 3.0 inches. Shield 82 consists of a lead plate having a length of 6.0 inches and a thickness of 1.0 inch.

With the particular high energy photon source employed herein, and with the specific materials to be analyzed and used for calibration that will be discussed more fully below, the spacing suitable in the present specific example of apparatus suitable for use with this invention comprises a distance of 3.5 inches between the center of the uranium target and the center of sample cell 26 and a distance of 2.5 inches between the center of sample cell 26 and the entry of detector 66.

The low energy photon apparatus employed in the specific embodiment of the analyzer described herewith consists of a source comprising a mixture of six millicuries of promethium-147 and aluminum. Sample cell 86 is constructed of aluminum and has a wall thickness of approximately 0.08 inch and a sample space between the walls of approximately 0.5 inch. Mounting tube 88 is constructed of aluminum and has a length of 12.0 inches with an internal diameter of 3.0 inches. Detector 96 consists of an end window ionization counter having an entry with an effective diameter of 1.75 inches. Collimators 106 and 108 are constructed of lead and are each three inches long. Collimators 106 and 108 have central passages therethrough each having a diameter of 1.75 inches, substantially equal to the diameters of the entry into detector 96.

The spacing and orientation among the structural elements of the low energy photon apparatus suitable with the apparatus and material employed to attain the specified limtiations for the radiation measurements comprising a distance of three inches between the center of the low energy photon source and the center of the sample cell and a distance of three inches between the center of the sample cell and the center of the detector. Shields 110 and 112 are one inch thick lead plates.

The discriminator means employed herewith comprises trigger circuits which permit the exclusion from the radiation counts of counting data in energy spectra outside the desired range for each particular apparatus. All three scalers employed in the specific embodiment described herein are of a commercially available type designated as an RIDL Model 49–28 Scaler manufactured by Radiation Instrument Development Laboratory, Melrose Park, Ill.

In a specific example of this invention, the apparatus of FIGURE 1 as described above was employed with an online digital computer to make cyclical density and composition analyses of the naphtha feed to a platformer and of the debutanized platformate. Small sample lines from the naphtha feed line and from the debutanized platformate line were interconnected to the sample conduit 20 through solenoid valves. These solenoid valves were set to operate at 30-minute intervals by timer 84 to cause alternate flow of naphtha feed and debutanized platformate through the analyzer. The computer was programmed to discard the data collected the first 15 minutes of each cycle, permitting this portion of the cycle to be used for flushing out the other fluid from the sample conduit and the sample cells. Thereby, one 15-minute analysis would be made of each stream every hour.

Heating elements 16 were energized and stirring means 18 was activated to circulate the heated neutron moderating transformer oil through the interior of outer housing 12 and around the other structural components of the analyzer apparatus. The temperature of the heating and moderating oil was raised and maintained substantially at $85° \pm 0.5°$ F.

Calibration standard inlet and outlet lines were also connected into the system to permit the standards to be passed through the sample conduit separate from the process samples. The apparatus was calibrated as described using benzene, toluene, ethylbenzene, cumene, sec-butylbenzene, n-pentane, n-hexane, n-heptane, and cyclohexane as the standards. The calibration constants were determined to be:

$A_1 = -0.1616$
$A_2 = 0.02252$
$A_3 = 2.102$
$B_1 = 0.3218$
$B_2 = -1.0733$
$B_3 = 11.668$
$\alpha = 321,000$ counts/15 min.
$\beta = 300,000$ counts/15 min.

These constants were stored in the computer memory and the calibration was then checked by analyzing a sample stream of substantially pure methylcyclohexane. The equipment read out a hydrogen concentration of 14.41 weight percent and a density of 0.7677 gm./cm.³ against a theoretical value of 14.37 and 0.7670 respectively, indicating successful calibration of the equipment.

The calibration standard inlet and outlet valves were then closed off and the process sample line valves were opened up for the cyclic process stream analysis. In a typical complete cycle the neutron count (I) for the naphtha feed was $2.1044 \times 10^6$ counts/15 minutes, the high energy photon count (J) was $2.5126 \times 10^6$ counts/ 15 minutes and an analysis of 14.48 weight percent hydrogen and a density of 0.7252 gm./cc. was printed out by the computer. In the other part of the cycle, the platformate gave a neutron count of $2.2292 \times 10^6$ counts/15 minutes and a high energy photon count of $2.4789 \times 10^6$ counts/15 minutes with a computer print out analysis of 12.46 weight percent hydrogen and a density of 0.7521 gm./cc. This type of information is extremely useful, either alone or with other data concurrently obtained, for making process studies directed to their understanding and optimization.

When the apparatus is used to make continuous or intermittent analysis of a single process stream, no flushing cycle is required. However, when used in the analysis of hydrocarbon samples of dissimilar compositions, the system must be flushed out after each analysis to ensure that prior sample contamination is completely eliminated from the sample cells. The counting cycle may be varied from a few seconds, preferably at least a minute, to an hour or more depending upon the precision and accuracy desired; however, the longer counting periods are generally not necessary for satisfactory precision and accuracy. Precision relates to the reproducibility of readings and accuracy relates to their closeness to the true value. In the analysis of a sample it is not necessary to maintain a continuous flow through the sample cells. In some instances it is preferred or is necessary to analyze a static sample and the measurement of the transmission of the different types of radiation need not occur concurrently.

A particular advantage of this apparatus is its ability to accurately analyze a series of hydrocarbon samples having a substantial variation both in their hydrogen content and in their density. Since the absorption of neutrons and high energy photons by a hydrocarbon are both a function of hydrogen concentration and density, our system accomplishes its high accuracy by correlating these variables and compensating for their mutual effect on the absorption of radiation. The same principle applies with respect to the three component analyzer in which neutron, high energy photon and low energy photon absorption is mutually correlated with variations in hydrogen concentration, density, and third component concentration, e.g. sulfur. Our analyzer can also distinguish samples of the same hydrogen concentration, e.g. position isomers, through their density difference.

This analytical equipment is also useful in refinery or petrochemical process analysis and control in which one or more process variables is adjusted in response to the equipment output to direct the operation of the process to a predetermined state of operation. This process control is accomplished either manually in response to the equipment output or by suitable transducing means adapted to convert the analyzer output to a mechanical, hydraulic or electrical output suitable to operate valves or other process controls.

The analyzer is used in process control when variations in hydrogen concentration, sulfur concentration, and/or density in a process stream are indicative of the efficacy of the operation and can be correlated with one or more controllable variables. The analyzed stream may be the input stream, the product stream, internal process streams, or more than one of these streams, with the results correlated into a meaningful output for regulation of a significant controllable variable such as a process stream flow rate, temperature, pressure, etc. or a combination of these variables. Analysis is preferably made of that process stream which produces analytical results most suitable for obtaining process objectives through control of one or more of the significant variables. For example, in the hydrogenation of benzene to cyclohexane, control is effected through the hydrogen partial pressure in the reactor by varying the hydrogen make up rate and hydrogen recycle bleed rate in response to the analysis of the product stream for its hydrogen content.

The combination of a digital computer with the scaler apparatus, although optional, permits the rapid and highly accurate and precise calculation of the physical and chemical quantities to be determined. This avoids the tedious manual solution of the equations involved in the determination of composition and density. Furthermore, when the computer output is used in process control, not only is much greater speed possible, but also much greater accuracy and precision obtains than if the scaler or counter output is used to change a process variable, since the computer has compensated and corrected for the mutual interdependency of radiation absorption on changes in density and composition of the sample. In many processes relatively small changes in composition and density of a critical process stream must be identified by analysis for process control and in some process streams relatively small numerical errors in control analyzer output will be magnified into significant error due to the sensitivity of the controlled variable particularly where there is no feedback to the analyzer of the results of control such as in a process controlled by the analysis of its feed stream. In these situations the precision and accuracy of our equipment greatly enhances its utility in comparison with other possible equipment utilizing different principles of operation.

According to this invention the measurements of the transmission, through a material to be analyzed, of different types of radiation is accomplished by novel methods which assure that at least a minimum magnitude of radiation count is attained while maintaining the ratios of signal to noise in each of the radiaton counts at a level adapted to assure reliable measurement of the transmitted radiation. There are provided also, according to this invention, novel methods for accounting for the inclusion of noise in each of the radiation counts so that the count of actually transmitted radiation can be used in the determination of the physical and chemical properties of the material to be analyzed.

As compared to methods for radiation measurement and material analysis available in the prior art, the method of this invention differs therefrom in the maintenance of minimum requirements for the magnitude of the total radiation count and the magnitude of the ratio of signal to noise. The method of this invention differs from the prior art further in the use and evaluation of the quantities $\alpha$, $\beta$ and $\gamma$ which account for the effect of noise in the radiation measurements. The measurement of at least a minimum total radiation count, obtained within a range of preferred counting rates, assures that the intensity of a beam of radiation passing through the material within a reasonably short period of time is adequate to produce a number of atomic and nuclear interactions between the radiation and the elements present in a material sufficient to indicate the concentrations of the various interacting atoms and nuclei within the limits of accuracy and precision as set forth above and much higher than the limits of accuracy and precision attainable with the methods and apparatus of the prior art.

In addition, the evaluation of the quantities, $\alpha$, $\beta$, and $\gamma$, and ultimately of the ratios of signal to noise, provides an indication of whether or not the intensity of non-transmitted radiation contributing to the radiation count is of such magnitude as to affect the precision and accuracy of the measurement significantly or to invalidate the measurement of transmitted radiation. It should be noted also that, although the physical and chemical analysis of a material to be analyzed is founded, in theory, on the valid measurement of the intensity of transmitted radiation, terms such as I and $I_s$, J and $J_s$, and K and $K_s$ in fact include non-transmitted radiation as well. In contrast, analytical calculations made employing the quantities of radiation measured by the method of this invention are based upon the terms $(I-\alpha)$, $(I_s-\alpha)$, $(J-\beta)$, $(J_s-\beta)$, $(K-\gamma)$, and $(K_s-\gamma)$, which terms represents more accurately the true count of only transmitted radiation. Thus the method of this invention conforms more closely to the theory underlying chemical and physical analysis of materials by measurement of radiation transmitted through the material.

The adherence to the minimum requirements specified for the radiation counting procedures assure that the radiation counts will be characterized by that degree of accuracy and precision required to provide a hitherto unattainable degree of accuracy, precision and reliability in the determination of the composition and density of a material. The radiation measurement methods disclosed herein, comprising the maintenance of minimum radiation counts and counting rates and the maintenance of specified ratios of signal to noise in conjunction with shielding of critical regions of the testing zones to reduce substantially the magnitude of the noise detected, facilitate the measuring of separate beams of different types of radiation simultaneously in close proximity to each other to provide a compact and continuously operative process stream analyzer.

Apparatus equivalent to the analyzer described herein hitherto have not been available, and there had not hitherto been disclosed any method such as the method of this invention for obtaining sufficiently accurate and precise measurements as are obtained by use of this invention. The apparatus of this invention is adapted to attain the objectives described above in the method of this invention with respect to obtaining minimum radiation counts and counting rates and maintaining specified ratios of signal to noise while shielding various portions of the apparatus to prevent the detection thereby of excessively large amounts of noise. It should be noted, with regard to the spacing and orientation of the elements of the apparatus, that it is important that, when each of the separate radiation measurement apparatus is assembled as part of the analyzer apparatus, the relative positions of each radiation source and detector with respect to their associated sample cells is adapted to enable the attainment of the limitations imposed upon the radiation measurements. Thus it is seen that suitable distances between the various elements of a given radiation apparatus must be determined by a process of successive trials and calibration and the proper positioning of those elements is a matter that can be determined readily by one skilled in the art operating within the limitations of the method of this invention.

The use of this invention in analyzing a process stream has the advantage of permitting the simultaneous measurement of the transmission through a sample of the process stream of two or more types of radiation simultaneously and in close proximity one to the other within the confines of a compact and easily operated process stream radiation analyzer apparatus. The connection of the data conversion apparatus associated with the apparatus of this invention with a digital computer as described herein enables the continuous measurement of transmitted radiation for a fixed counting time, such as five minutes, and the simultaneous calculation by the computer of the chemical and physical properties based upon the previous counting data while the analyzer apparatus is employed in obtaining the next set of radiation transmission data. By the use of such successive determinations of the physical and chemical characteristics, analysis of the process stream can be made continually and rapidly to enable an operator to maintain current control of the process or to facilitate the continuous automatic control of the process stream by automatic control apparatus combined with the radiation analyzer and computer apparatus described herein.

The method and apparatus of this invention has been described in detail with respect to the determination of hydrogen and carbon in a sample containing one or more hydrocarbons or with respect to the determination of hydrogen, carbon and a third element, such as sulfur; in which the expression hydrocarbon, hydrocarbon-base or hydrocarbon material is used to indicate one compound or a mixture of compounds comprising only hydrogen and carbon or including, in addition, a small molar amount of one or more other elements, such as sulfur, and with respect to the particular elements of structure of the apparatus employed. Furthermore the method of this invention is useful to determine the densities and compositions of any other materials that are capable of producing attenuation of two or more different types of transmitted radiation in the energy spectra associated with the radiation employed in which the attenuation correlates with the density and the composition of the sample.

The use of a specific type of radiation to measure a different property of a material other than those specifically described herein will be readily determinable by one skilled in the art, and the substitution of different but equivalent elements of structure for those described specifically herein also will be readily apparent to one skilled in the art. However it is noted that the simultaneous measurement of different types of radiation while observing limitations upon the magnitude of radiation count, the radiation counting rates, and the ratios of signal to noise are comprehended by the concept of this invention, as is the use of apparatus adapted for the obtaining of radiation counting data within the limitations prescribed. Therefore, the description of specific manipulative techniques and apparatus present herein is not intended to express limitations of the scope of this invention which would be more restrictive than the limitations defined by the following claims.

Therefore we claim:

1. A highly accurate method for analyzing a hydrocarbon material which comprises:

subjecting in separate zones at least two hydrocarbon reference standards of known properties to at least two types of radiation including thermal neutron radiation and high energy photon radiation each at constant intensity, said thermal neutron radiation partially interacting with said hydrocarbon material primarily as a function of its hydrogen content and secondarily as a function of its density and said high energy photon radiation partially interacting with said hydrocarbon material primarily as a function of its density and secondarily as a function of its hydrogen content, sensing the intensity of each type of radiation which is transmitted through each reference standard including a noise component, subjecting a sample of an unknown hydrocarbon material to the same radiation in the same zones, sensing the intensity of each type of radiation which is transmitted through the unknown sample including a noise component, and determining the value of at least one property of said unknown hydrocarbon material by intercorrelating the amount of each type of radiation transmitted both through said unknown material and through each said reference standard with substantial elimination of the noise component of each of the sensed radiations.

2. A method in accordance with claim 1 in which at least one property of the unknown sample selected from hydrogen concentration, carbon concentration and density is determined by intercorrelating the amount of each type of radiation transmitted through said unknown material and through each said reference standard using the following equations:

$$x = A_1 \ln (I-\alpha) + A_2 \ln (J-\beta) + A_3$$
$$y = B_1 \ln (I-\alpha) + B_2 \ln (J-\beta) + B_3$$
$$\rho = x + y = x/W_H = y/W_C$$

where $x$ and $y$ are, respectively, the weights of hydrogen and carbon per unit volume of said sample, $\rho$ is the density of said sample, $I$ is the count of neutrons transmitted through said unknown sample per unit time, $J$ is the count of high energy photons transmitted through said unknown sample per unit time, $W_H$ and $W_C$ are, respectively, the weight fractions of hydrogen and carbon in said unknown sample, $\alpha$ and $\beta$ are calibration constants which compensate for noise in the sensed radiation counts, and $A_1$, $A_2$, $A_3$, $B_1$, $B_2$ and $B_3$ are physical and unit conversion constants, said calibration, physical and unit conversion constants being derived from the reference standards.

3. A method in accordance with claim 2 in which the sensed intensity of the transmitted neutron beam is at least 20,000 counts per minute at a neutron signal to noise level of at least about 3.0, and the sensed intensity of the transmitted high energy photon beam is at least 20,000 counts per minute at a high energy photon signal to noise ratio of at least about 10.0, and in which at least one reference standard is utilized per constant.

4. A method in accordance with claim 1 in which the unknown hydrocarbon sample is taken from a hydrocarbon process stream and in which a variable in said process is controlled in response to the value of a property determined by said analysis.

5. A method in accordance with claim 4 in which said property of the hydrocarbon sample used for process control is weight percent hydrogen in said hydrocarbon sample.

6. A method in accordance with claim 1 in which neutron radiation, high energy photon radiation, and low energy photon radiation is utilized therein.

7. A method in accordance with claim 6 in which at least one property of the unknown sample selected from hydrogen concentration, carbon concentration, third element sulfur concentration, and density is determined by intercorrelating the amount of each type of radiation transmitted through said unknown material and through each said reference standard using the following equations:

$$x = D_1 \ln (I-\alpha) + D_2 \ln (J-\beta) + D_3 \ln (K-\gamma) + D_4$$
$$y = E_1 \ln (I-\alpha) + E_2 \ln (J-\beta) + E_3 \ln (K-\gamma) + E_4$$
$$z = C_1 \ln (I-\alpha) + C_2 \ln (J-\beta) + C_3 \ln (K-\gamma) + C_4$$
$$\rho = x + y + z = x/W_H = y/W_C = z/W_S$$

where $x$, $y$ and $z$ are, respectively, the weights of hydrogen, carbon and sulfur per unit volume of said sample, $I$ is the count of neutrons transmitted through said sample per unit time, $J$ is the count of high energy photons transmitted through said sample per unit time, $K$ is the count of low energy photons transmitted through said sample per unit time, $\rho$ is the density of said sample, $W_H$, $W_C$ and $W_S$ are, respectively, the weight fractions in said sample of hydrogen, carbon and sulfur, $\alpha$, $\beta$, and $\gamma$ are calibration constants which compensate for noise in the sensed radiation counts, and $D_1$, $D_2$, $D_3$, $D_4$, $E_1$, $E_2$, $E_3$, $E_4$, $C_1$, $C_2$, $C_3$, and $C_4$ are physical and unit conversion constants said calibration, physical and unit conversion constants being derived from the reference standards.

8. A method in accordance with claim 7 in which the sensed intensity of the transmitted neutron beam is at least 20,000 counts per minute at a neutron signal to noise level of at least 3.0, the sensed intensity of the transmitted high energy photon beam is at least 20,000 counts per minute at a high energy photon signal to noise ratio of at least about 10.0, and the sensed intensity of the transmitted low energy photon beam is at least 20,000 counts per minute at a high energy photon signal to noise ratio of at least about 10.0.

9. A method in accordance with claim 6 in which the unknown hydrocarbon sample is taken from a hydrocarbon process stream and in which a variable in said process is controlled in response to the value of the property determined by said analysis.

10. A method in accordance with claim 9 in which said property of the hydrocarbon sample used for process control is the concentration of sulfur in said hydrocarbon sample.

References Cited

UNITED STATES PATENTS

| | | |
|---|---|---|
| 2,817,764 | 12/1957 | Jacobs et al. |
| 2,898,466 | 8/1959 | Lintz et al. |
| 2,966,587 | 12/1960 | Faulkner et al. |
| 3,255,975 | 6/1966 | Malin et al. |

RALPH G. NILSON, Primary Examiner

D. L. WILLIS, Assistant Examiner

U.S. Cl. X.R.

250—83.1